United States Patent [19]
Williams

[11] 3,831,720
[45] Aug. 27, 1974

[54] DRUM BRAKE ACTUATORS

[75] Inventor: Malcolm Clarence Williams, Caerleon, Wales

[73] Assignee: Girling Limited, London, England

[22] Filed: Dec. 8, 1972

[21] Appl. No.: 313,523

[30] Foreign Application Priority Data
Dec. 10, 1971  Great Britain .................. 57414/71

[52] U.S. Cl. ................................. 188/343, 74/110
[51] Int. Cl. ............................................ F16d 51/18
[58] Field of Search .............. 74/110; 188/343, 368

[56] References Cited
UNITED STATES PATENTS
2,140,123  12/1938  Whiteacre ..................... 188/343 X
3,388,606  6/1968  Hill ................................. 188/343 X
3,511,103  5/1970  Cox ..................................... 74/110

Primary Examiner—Duane A. Reger
Attorney, Agent, or Firm—Scrivener Parker Scrivener & Clarke

[57] ABSTRACT

A drum brake roller expander actuator has a wedge member for outwardly displacing a pair of opposed tappets and a pair of spaced parallel rollers, each arranged between a respective tappet and an inclined face of the wedge member. The rollers are coupled to and located relative to the wedge member by resilient retainer means carried by the wedge member and engaging the ends of the rollers.

7 Claims, 6 Drawing Figures

DRUM BRAKE ACTUATORS

The invention relates to drum brake actuators and more particularly to roller expander actuators for vehicle drum brakes.

Roller expander actuators of the type which have a pair of parallel rollers arranged between opposed slidable tappets and the inclined faces of a wedge member are subject to malfunction if the rollers fall away from the wedge member in the event of the tappets being moved outwardly other than by the wedge member. Such movement may, for example, be caused by vehicle jolts during brake actuation. It is also difficult to assemble actuators of this type.

The present invention seeks to provide a drum brake actuator of this type in which the tendency to malfunction is reduced and in which assembly is facilitated.

According to a first aspect of the present invention, a wedge member for a roller expander actuator of the type described has opposite inclined faces engaged by spaced parallel rollers which are yieldably urged into contact with said faces and into mutually parallel relationship by resilient retainer means carried by the wedge member.

According to a second aspect of the present invention, in a drum brake actuator having a pair of opposed tappets urged outwardly by spaced parallel rollers which engage opposite inclined faces of a displaceable wedge member, the rollers are coupled together by resilient retainer means carried by the wedge member which yieldably urge the rollers against the wedge member and into mutually parallel relationship.

The retainer means are preferably formed of wire and may be formed from a single piece of wire engaging both ends of both rollers or may comprise two parts, each of which interconnects adjacent ends of respective rollers. The retainer means conveniently seat in grooves formed in opposite sides of the wedge member.

The invention is further described, by way of example, with reference to the accompanying drawings, in which.

Figure 1:
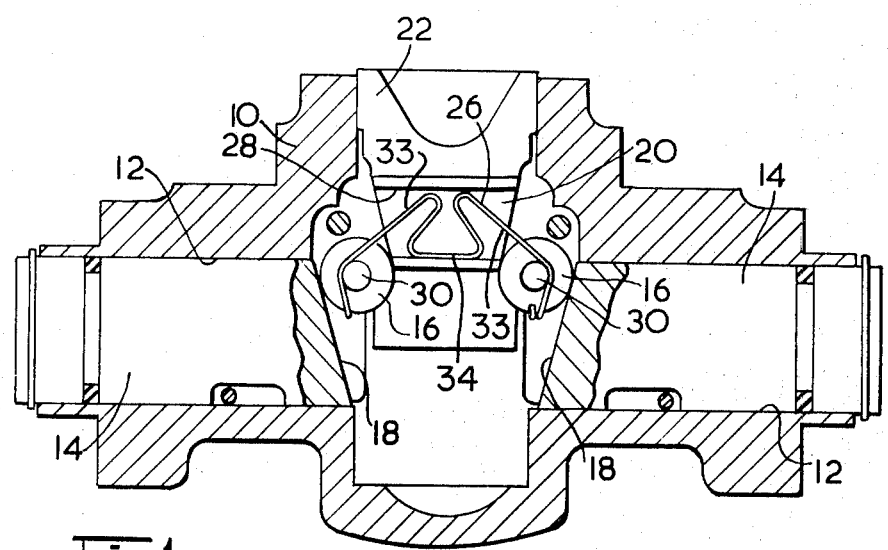
FIG. 1 shows, partly in section, a roller expander illustrating one embodiment of the invention.

The actuator shown in FIG. 1 comprises a housing 10 having aligned bores 12 which may be of circular or other, for example rectangular, cross-section. Tappets 14 having slotted inner ends are slidable in the bores 12 and cooperate with rollers 16 which are guided in the slotted ends and which abut against inclined opposed faces 18 within the slots.

The rollers 16 also abut against opposite inclined faces of a wedge member 20 carried by a plunger 22 slidable in a direction perpendicular to the common axis of the tappets 14. Displacement of the plunger 22 and wedge member 20 in a downward direction as viewed in FIG. 1 causes outward displacement of the tappets 14 in their bores 12.

Figure 2:
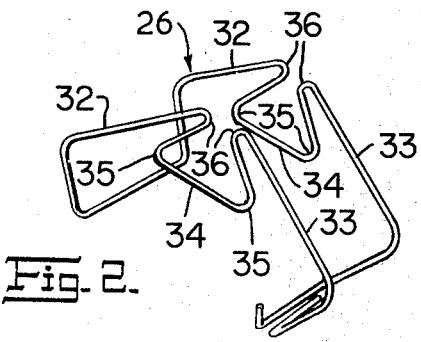
FIG. 2 is a perspective view of a wire retainer used in the embodiment of FIG. 1.
Figure 3:
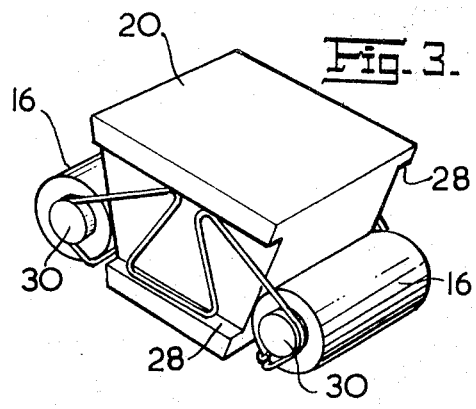
FIG. 3 is a perspective view of the retainer of FIG. 2 mounted on a wedge member and retaining a pair of rollers.
Figure 4:
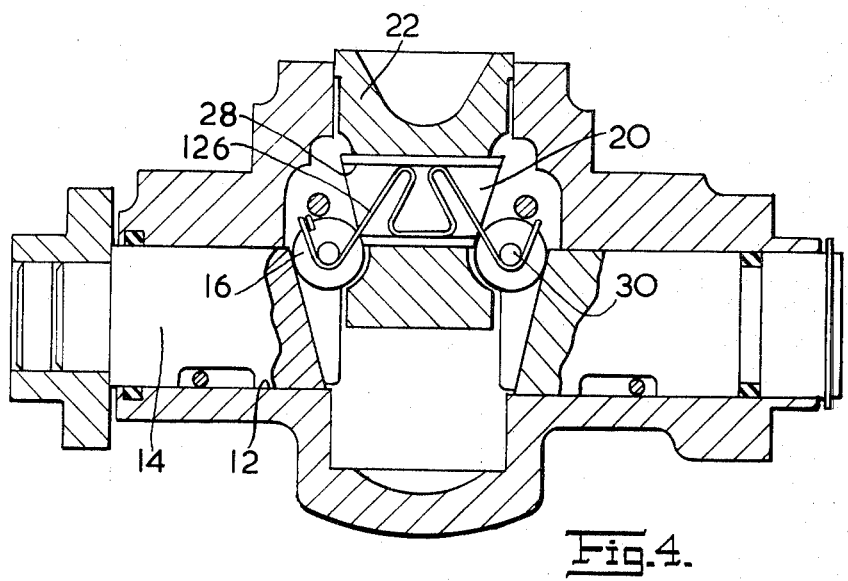
FIG. 4 is a section, similar to FIG. 1, of a second embodiment of the invention.
Figure 5:
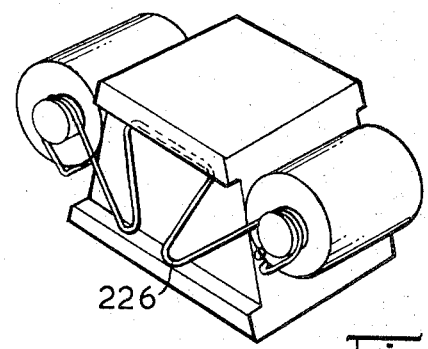
FIG. 5 is a view similar to FIG. 3 of a third embodiment.
Figure 6:
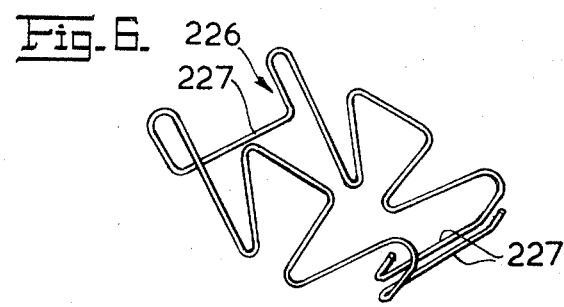
FIG. 6 is a perspective view of the wire retainer used in FIG. 5.

A resilient wire retainer 26 is mounted in grooves 28 in the wedge member 20 and couples the rollers 16 together such as to urge the rollers against the wedge member 20 and into mutually parallel relationship perpendicular to the direction of displacement of the plunger 22. In the embodiment of FIGS. 1 to 3, limbs of the retainer 26 pass over reduced diameter end portions 30 of the rollers 16. The embodiment of FIG. 4 differs only in that the retainer 126 passes beneath the end portions 30. The free ends of the wire retainer may advantageously be joined together by, for example, forming interlocking hooks or like formations at the free ends. In FIGS. 5 and 6 axially extending parts 227 of the retainer 226 are located between the rollers and the wedge member to further facilitate assembly of the actuator, and the free ends of the retainer extend to and hook over opposite ends of one of the rollers.

In each of the illustrated embodiments, the wire retainer 26,126 is formed from a single piece of wire and seats in both grooves 28 of the wedge member 20. Alternatively, the wire retainer may be in two parts, each coupling adjacent ends of respective rollers. In this case, the wire retainers may terminate at the reduced diameter portions 30 rather than extend axially along the rollers 16.

The wire retainer 26 of FIGS. 1–3 on each side of the wedge member 20 has limb portions 32,33 which engage the rollers and a bridging portion 34 connected to each of said limb portions by pairs of acute bends 35,36. The arrangement is such that deformation of a limb upon movement of the rollers with respect to the wedge member is apportioned between a pair of acute bends rather than being sustained by a single bend. The retainer in FIGS. 4–6 is similarly constructed.

In addition to urging the rollers 16 against the wedge member 20 and into mutually parallel relationship perpendicular to the direction of displacement of the plunger 22, the retainer also facilitates assembly of the actuator. To assemble the actuator, the rollers 16 are retained on the wedge member to from the unit shown in FIG. 3, the plunger 22 is introduced into the housing 10 with a transverse aperture, dimensioned to receive the wedge member 22, aligned with the bores 12, the wedge and roller assembly is passed along one of the bores 12 and positioned in the plunger aperture and subsequently, the tappets 14 are introduced into their respective bores 12. It will be appreciated that prior assembly of the wedge member and rollers into a unit considerably facilitates assembly of the actuator.

I claim:

1. A wedge member for a roller expander actuator, comprising a body member, opposite inclined faces on said body member, spaced parallel rollers engaging respective ones of said faces and resilient retainer means carried by said body member and comprising a single wire member engaging both ends of each of said rollers and yieldably urging said rollers into contact with said faces and into mutually parallel relationship.

2. A wedge member according to claim 1 wherein grooves are formed in opposite sides of said body member and wherein said resilient retainer means seats in said grooves.

3. A wedge member according to claim 1 wherein a reduced diameter portion extends from each end of each of said rollers and wherein said resilient retainer means engages said reduced diameter portions.

4. A wedge member according to claim 1 wherein grooves are formed in opposite sides of said body member and wherein a reduced diameter portion extends from each end of each of said rollers, said resilient retainer means seating in said grooves and engaging said reduced diameter portions.

5 A roller expander actuator for a drum brake, comprising a wedge member having opposite inclined faces, means displaceably mounting said wedge member, spaced parallel rollers engaging said opposite inclined faces of said wedge member, a pair of tappets, means mounting said tappets for outward movement upon operative displacement of said wedge member, and resilient retainer means carried by said wedge member and comprising a single wire member engaging both ends of each of said rollers and yieldably urging said rollers into contact with said faces and into mutually parallel relationship.

6. A roller expander actuator according to claim 5 wherein grooves are formed in opposite sides of said wedge member and wherein a reduced diameter portion extends from each end of each of said rollers, said resilient retainer means seating in said grooves and engaging said reduced diameter portions.

7. The wedge member of claim 1 wherein on each side of said wedge member, said wire member has limb portions which engage said rollers, and a bridging portion connected to each of said limb portions by pairs of acute bends in said wire members whereby deformation of a limb upon movement of said rollers with respect to said wedge member is apportioned between a pair of acute bends.

* * * * *

UNITED STATES PATENT OFFICE
CERTIFICATE OF CORRECTION

Patent No. 3,831,720    Dated August 27, 1974

Inventor(s) Malcolm Clarence Williams

It is certified that error appears in the above-identified patent and that said Letters Patent are hereby corrected as shown below:

On the cover sheet change the address of the assignee from London to Birmingham, England.

Signed and sealed this 19th day of November 1974.

(SEAL)
Attest:

McCOY M. GIBSON JR.
Attesting Officer

C. MARSHALL DANN
Commissioner of Patents